(12) United States Patent
Kang et al.

(10) Patent No.: US 8,331,903 B2
(45) Date of Patent: Dec. 11, 2012

(54) CHARGING METHOD AND SYSTEM FOR PUSH-TO-TALK OVER CELLULAR SYSTEM

(75) Inventors: Jiao Kang, Shenzhen (CN); Mingjun Shan, Shenzhen (CN); Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/310,355

(22) Filed: Dec. 2, 2011

(65) Prior Publication Data

US 2012/0077460 A1    Mar. 29, 2012

Related U.S. Application Data

(63) Continuation of application No. PCT/CN2010/073538, filed on Jun. 4, 2010.

(30) Foreign Application Priority Data

Jun. 4, 2009 (CN) .......................... 2009 1 0086518

(51) Int. Cl.
*H04M 11/00* (2006.01)
(52) U.S. Cl. ........ 455/408; 455/406; 455/518; 370/312; 370/340; 370/401; 370/329; 379/114.01
(58) Field of Classification Search .......... 455/405–408; 370/230, 344, 338, 401
See application file for complete search history.

(56) References Cited

U.S. PATENT DOCUMENTS

| | | | |
|---|---|---|---|
| 2004/0266391 A1* | 12/2004 | Hafren | 455/405 |
| 2008/0247373 A1* | 10/2008 | Synnergren et al. | 370/340 |
| 2009/0080353 A1 | 3/2009 | Zhang et al. | |
| 2009/0137289 A1* | 5/2009 | Shan et al. | 455/573 |
| 2010/0318448 A1 | 12/2010 | Li et al. | |

FOREIGN PATENT DOCUMENTS

| | | |
|---|---|---|
| CN | 1362842 A | 8/2002 |
| CN | 1867023 A | 11/2006 |
| CN | 101252449 A | 8/2008 |
| CN | 101374055 A | 2/2009 |
| EP | 2 023 588 A1 | 2/2009 |
| WO | WO 2005/120039 A1 | 12/2005 |

OTHER PUBLICATIONS

Communication (extended European search report) dated Feb. 2, 2012 issued in connection with European Application No. 10782984.8.

Written Opinion of the International Searching Authority dated Sep. 2, 2010 in connection with International Patent Application No. PCT/CN2010/073538.

(Continued)

*Primary Examiner* — Marcos Batista
*Assistant Examiner* — Keith Fang

(57) ABSTRACT

Embodiments of the present invention relate to a charging method and system for a Push-to-talk over Cellular (PoC) system. The charging method for a PoC system includes: after sending an initial online charging request to an Online Charging System (OCS), receiving an initial online charging response message that is sent by the OCS and carries a downlink channel type switching trigger variable; monitoring a type of a downlink channel used by a PoC service according to the downlink channel type switching trigger variable; and sending an online charging request to the OCS if switching of the type of the downlink channel used by the PoC service is detected, where the online charging request includes a switched type of the downlink channel. The embodiments of the present invention implement precise and proper charging for a PoC client when the PoC client switches a channel.

12 Claims, 7 Drawing Sheets

OTHER PUBLICATIONS

"Push to talk over Cellular (PoC)—Architecture", Candidate Version 2.0, Aug. 6, 2008, Open Mobile Alliance, 54 pages.

International Search Report dated Sep. 2, 2010 in connection with International Patent Application No. PCT/CN2010/073538.

* cited by examiner

CHARGING METHOD AND SYSTEM FOR PUSH-TO-TALK OVER CELLULAR SYSTEM

CROSS-REFERENCE TO RELATED APPLICATIONS

This application is a continuation of International Application No. PCT/CN2010/073538, filed on Jun. 4, 2010, which claims priority to Chinese Patent Application No. 200910086518.0, filed on Jun. 4, 2009, both of which are hereby incorporated by reference in their entireties.

TECHNICAL FIELD

The present invention relates to communications technologies, and in particular, to a charging method and system for a Push-to-talk over Cellular system.

BACKGROUND

PoC (Push-to-talk over Cellular, PoC for short) is a push-to-talk service based on a public cellular mobile communication network. A user needs only to press one key like using a walkie-talkie to quickly and directly perform one-to-one or one-to-multiple instant communication with one or multiple users in any place without a need to dial a number. A PoC system includes a PoC client (PoC Client), a PoC server (PoC Server), and an Online Charging System (Online Charging System, OCS for short). The PoC client residing in a mobile terminal is used to get access to a PoC service, and support session initiation, participation, and termination. The PoC server is divided into a PoC Controlling Function (PoC Controlling Function, PoC CF for short) and a PoC Participating Function (PoC Participating Function, PoC PF for short). The PoC CF exercises centralized control on a session, including media distribution, controlling the floor, executing a session policy on members that participate in a session, and processing information about participating members. The PoC PF provides session control, including exercising policy control on incoming sessions, relaying floor control signaling between the PoC CF and the PoC client, and so on. Depending on a requirement, the PoC PF may also provide relaying of a media stream and store a user's service settings such as an answer mode and incoming call barring. In PoC 2.0 version standard and earlier versions, a dedicated channel (Normal PoC Channel) is used. That is, for each PoC client, an uplink radio channel and a downlink radio channel exist logically. The uplink radio channel is configured to send a talk burst (Talk Burst) or a media burst (Media Burst) to the PoC server, and the downlink radio channel is configured to receive the talk burst or the media burst. Each PoC client physically occupies an independent radio channel to send and receive the talk burst (Talk Burst) or the media burst (Media Burst). With an increase of users, loads on the PoC server and a wireless network increase rapidly, which affects conventional voice services and data services. To further optimize usage of wireless network resources, a multicast channel (Multicast PoC Channel) is introduced into PoC 2.1 version standard. That is, in a PoC session, when the number of PoC clients in one cell reaches a specified number, the PoC server sets up a multicast channel, where the multicast channel is exclusively used for receiving a downlink talk burst or media burst. With the multicast channel in use, for each PoC client, an uplink radio channel exists; for PoC clients in the same cell in a session, a downlink radio channel is shared.

In PoC 2.0 version standard and earlier versions, the PoC client gets access to the PoC service only through a dedicated channel. Therefore, the OCS charges only a PoC client that uses the dedicated channel. When the channel through which the PoC client gets access to the PoC service is switched during the course of using the service by the PoC client, the OCS is unaware of the switching of the channel through which the PoC client gets access to the PoC service and unable to perform precise and proper charging for the PoC client that switches the channel through which the PoC client gets access to the PoC service.

SUMMARY

Embodiments of the present invention provide a charging method and system for a PoC system to perform precise and proper charging for a PoC client when the PoC client switches a channel through which the PoC client gets access to the PoC service.

An embodiment of the present invention provides a charging method for a PoC system, including:

after sending an initial online charging request to an OCS, receiving an initial online charging response message that is sent by the OCS and carries a downlink channel type switching trigger variable;

monitoring, according to the downlink channel type switching trigger variable, a type of a downlink channel used by a PoC service; and sending an online charging request to the OCS if switching of the type of the downlink channel used by the PoC service is detected, where the online charging request includes a switched type of the downlink channel.

An embodiment of the present invention provides another charging method for a PoC system, including:

receiving an initial online charging request sent by a PoC server;

sending to the PoC server an initial online charging response message that carries a downlink channel type switching trigger variable; and receiving an online charging request that is sent, after a change of a type of a downlink channel used by a PoC service is detected according to the downlink channel type switching trigger variable, by the PoC server, where the online charging request carries a switched type of the downlink channel.

An embodiment of the present invention provides a PoC server, including:

a first sending module, configured to send an initial online charging request to an OCS;

a first receiving module, configured to receive an initial online charging response message that is sent by the OCS and carries a downlink channel type switching trigger variable; and a monitoring module, configured to monitor, according to the downlink channel type switching trigger variable, a type of a downlink channel used by a PoC service;

where, the first sending module is further configured to send an online charging request to the OCS if the monitoring module detects switching of the type of the downlink channel used by the PoC service, where the online charging request carries a switched type of the downlink channel.

An embodiment of the present invention provides an OCS, including:

a second receiving module, configured to receive an initial online charging request sent by a PoC server; and a second sending module, configured to send to the PoC server an initial online charging response message that carries a downlink channel type switching trigger variable;

where, the second receiving module is further configured to receive an online charging request that is sent, after a change of a type of a downlink channel used by a PoC service is detected according to the downlink channel type switching trigger variable, where the online charging request carries a switched type of the downlink channel.

An embodiment of the present invention provides a charging system for a PoC system, including a PoC server and an OCS.

The PoC server is configured to: after sending an initial online charging request to the OCS, receive an initial online charging response message that is sent by the OCS and carries a downlink channel type switching trigger variable; monitor, according to the downlink channel type switching trigger variable, a type of a downlink channel used by a PoC service; and send an online charging request to the OCS if switching of the type of the downlink channel used by the PoC service is detected, where the online charging request carries a switched type of the downlink channel.

The OCS is configured to: receive the initial online charging request sent by the PoC server, send to the PoC server the initial online charging response message that carries the downlink channel type switching trigger variable, and receive the online charging request.

With the charging method and system for a PoC system in the embodiments of the present invention, the PoC server monitors, as instructed by the OCS, the type of the downlink channel used by the PoC service, and sends the switched type of the downlink channel to the OCS upon occurrence of channel switching, so that the OCS adjusts a tariff according to the switched type of the downlink channel, and an operator may accurately measure usage of radio resources by each PoC client in a session process. In this way, an incapability of charging a PoC client that switches a channel in the prior art is overcome, and precise and proper charging for the PoC client is implemented when the PoC client switches the channel used by the PoC service.

DETAILED DESCRIPTION

The technical solutions of the present invention are further detailed in detail below with reference to the accompanying drawings and exemplary embodiments.

Figure 1:
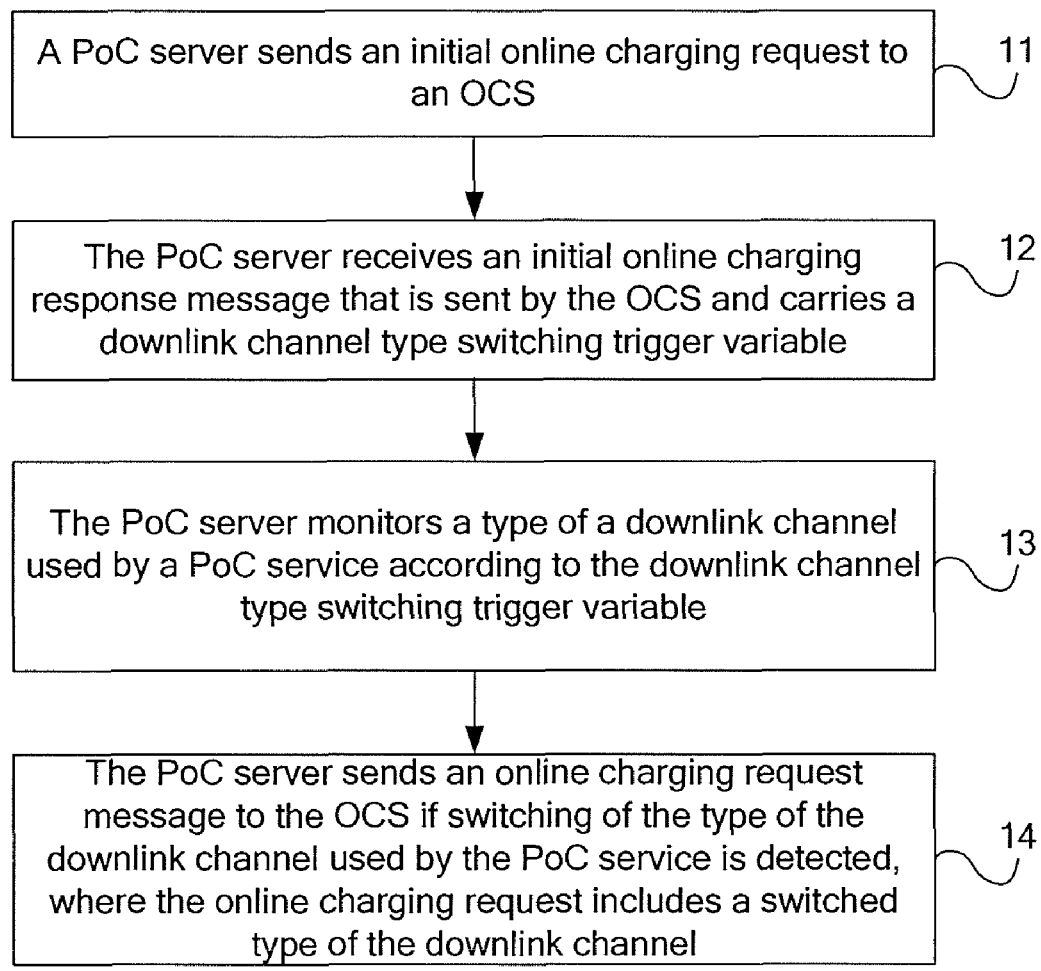
FIG. 1 is a schematic flowchart of a charging method for a PoC system according to an embodiment of the present invention.

FIG. 1 is a schematic flowchart of a charging method for a PoC system according to an embodiment of the present invention. The charging method may include the following steps:

Step 11: A PoC server sends an initial online charging request to an OCS.

When a service begins, the PoC server sends an initial online charging request to the OCS to trigger the OCS to start charging.

Step 12: The PoC server receives an initial online charging response message that is sent by the OCS and carries a downlink channel type switching trigger variable.

Step 13: The PoC server monitors, according to the downlink channel type switching trigger variable, a type of a downlink channel used by a PoC service.

As instructed by the OCS, the PoC server monitors a change of the type of the downlink channel used by the PoC service.

Step 14: The PoC server sends an online charging request to the OCS if switching of the type of the downlink channel used by the PoC service is detected, where the online charging request includes a switched type of the downlink channel.

Therefore, the OCS can adjust a tariff according to the switched type of the downlink channel, and perform charging.

In the embodiment, the PoC server monitors, as instructed by the OCS, the type of the downlink channel used by the PoC service, and sends the type of the downlink channel used by the PoC service to the OCS upon occurrence of channel switching, so that the OCS may adjust the tariff according to the switched type of the downlink channel, and an operator may accurately measure usage of radio resources by each PoC client in a session process. In this way, an incapability of charging a PoC client that switches a channel used by the PoC service in the prior art is overcome, and precise and proper charging for the PoC client is implemented when the PoC client switches the channel used by the PoC service.

Figure 2:
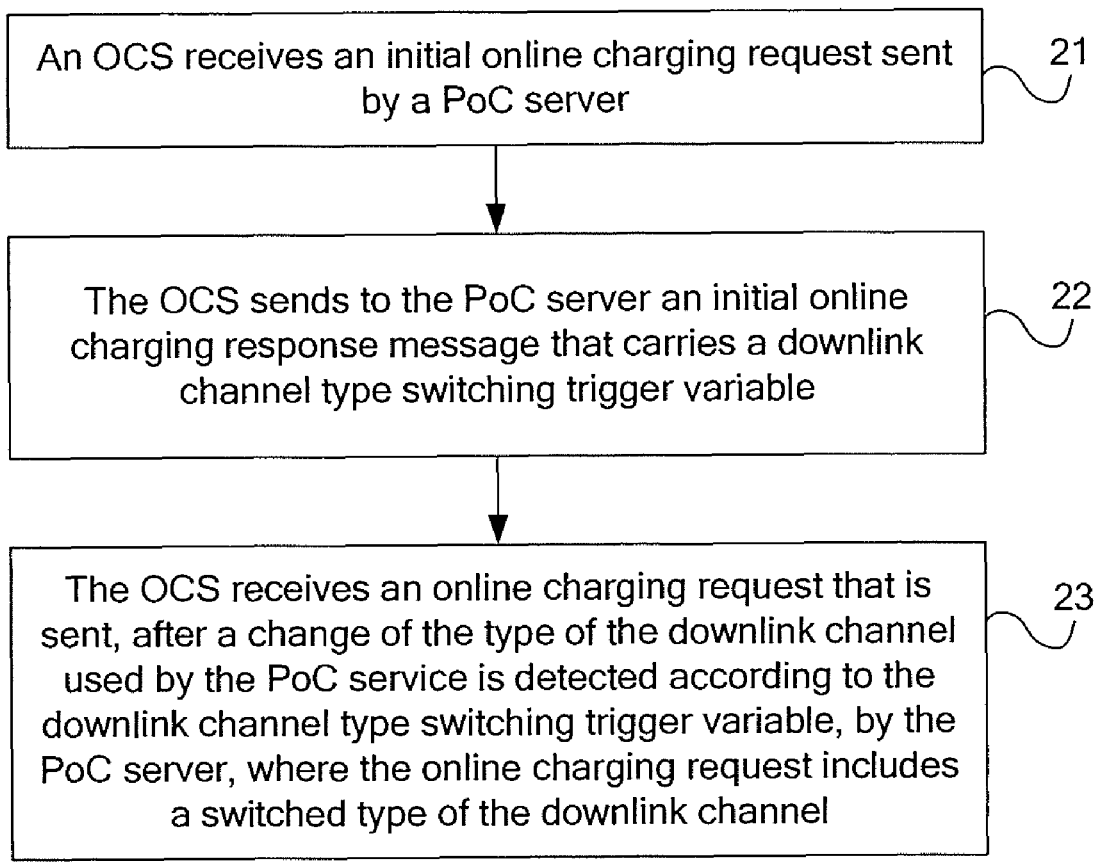
FIG. 2 is a schematic flowchart of a charging method for a PoC system according to another embodiment of the present invention.

FIG. 2 is a schematic flowchart of a charging method for a PoC system according to another embodiment of the present invention. The charging method may include the following steps:

Step 21: An OCS receives an initial online charging request sent by a PoC server.

After receiving the initial online charging request, the OCS starts charging the PoC client according to a default dedicated channel.

Step 22: The OCS sends to the PoC server an initial online charging response message that carries a downlink channel type switching trigger variable.

Through this step, the OCS may instruct the PoC server to monitor a type of a downlink channel used by a PoC service, so as to properly perform charging on the PoC client.

Step 23: The OCS receives an online charging request that is sent, after a change of the type of the downlink channel used by the PoC service is detected according to the downlink channel type switching trigger variable, by the PoC server, where the online charging request carries a switched type of the downlink channel.

Therefore, the OCS may adjust a tariff according to the switched type of the downlink channel.

In this embodiment, the OCS instructs the PoC server to monitor the type of the downlink channel used by the PoC service, and receives the switched type of the downlink channel that is sent, after the change of the type of the downlink channel used by the PoC service is detected, by the PoC server, so that the OCS may adjust the tariff according to the switched type of the downlink channel, and an operator may accurately measure usage of radio resources by each PoC client in a session process. In this way, an incapability of charging a PoC client that switches a channel used by the PoC service in the prior art is overcome, and precise and proper charging for the PoC client is implemented when the PoC client switches the channel used by the PoC service.

Figure 3:
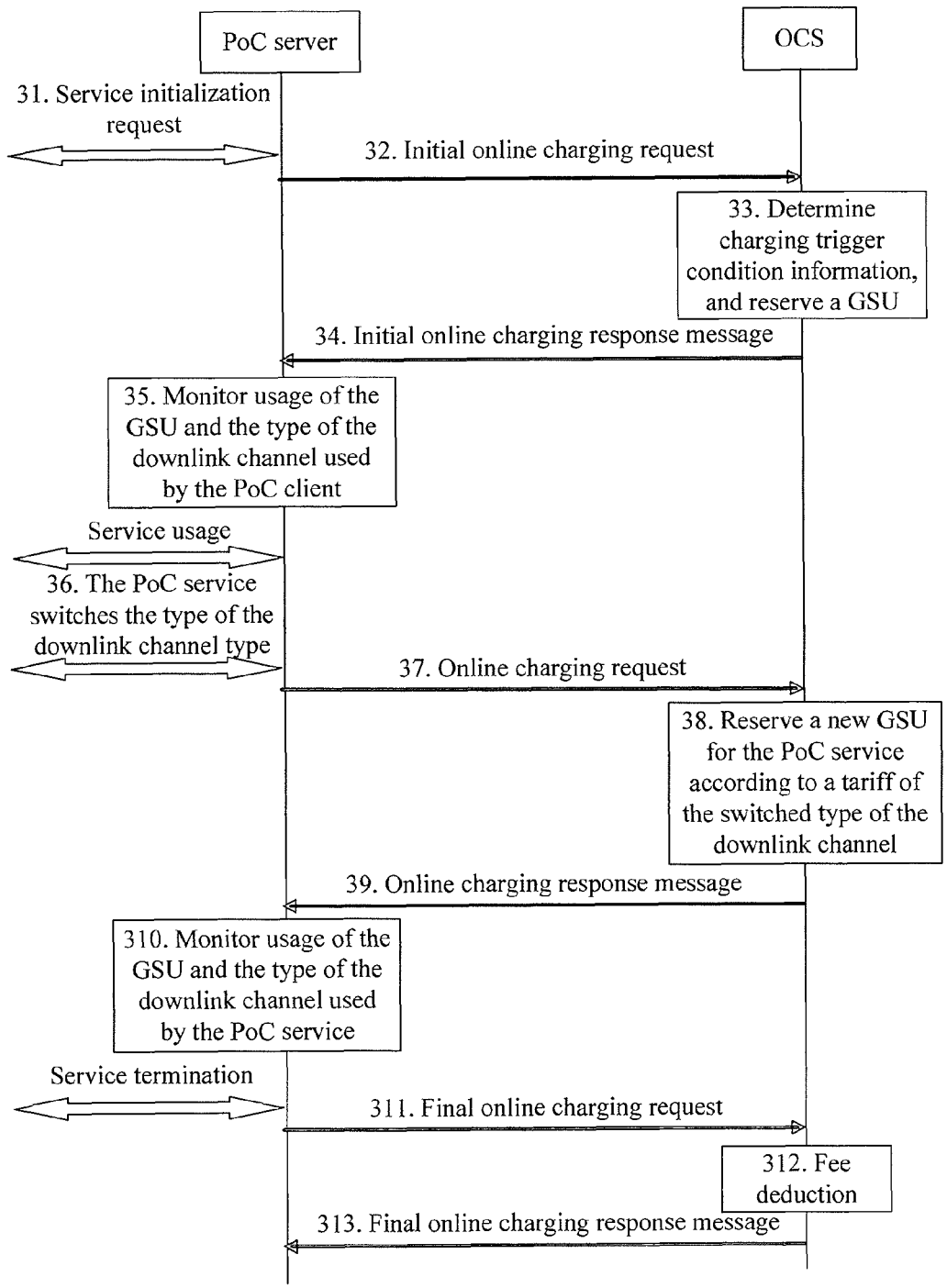
FIG. 3 is a schematic flowchart of a charging method for a PoC system according to another embodiment of the present invention.

FIG. 3 is a schematic flowchart of a charging method for a PoC system according to another embodiment of the present invention. The charging method may include the following steps:

Step 31: A PoC server receives a service initialization request sent by a PoC client, where the service initialization request carries a Support-Multicast-Channel Indication (Support-Multicast-Channel Indication) indicating that the PoC client supports a multicast channel.

Step 32: The PoC server obtains the Support-Multicast-Channel Indication from the service initialization request, and submits an initial online charging request that carries the Support-Multicast-Channel Indication to an OCS. The initial online charging request may further carry a type of a downlink channel (Downlink-Channel-Type) currently used by a PoC service. The type of the downlink channel may include a multicast channel or a dedicated channel.

Step 33: The OCS determines charging trigger condition information of the PoC service according to the Support-Multicast-Channel Indication, and reserves a Granted Service Unit (GSU) for the PoC service according to the type of the downlink channel currently used by the PoC service, where the charging trigger condition information includes a downlink channel type switching trigger variable (CHANGE_IN_DOWNLINK_CHANNEL_TYPE).

It should be noted that the delivered downlink channel type switching trigger variable may be irrelevant to the Support-Multicast-Channel Indication. That is, no matter whether the PoC client supports the multicast channel, the OCS may deliver the downlink channel type switching trigger variable to the PoC server, so as to instruct the PoC server to monitor the type of the downlink channel. In addition, the OCS may also generate a user bill according to the type of the downlink channel currently used by the PoC service.

The GSU may be duration, traffic, and so on. The type of the downlink channel varies; therefore the tariff used by the OCS varies, and the reserved GSU also varies.

Step 34: The OCS delivers to the PoC server an initial online charging response message, where the initial online charging response message includes the charging trigger condition information and the reserved GSU.

Step 35: The PoC server monitors usage of the GSU by the PoC service according to the reserved GSU, and monitors, according to the downlink channel type switching trigger variable carried in the charging trigger condition information, the type of the downlink channel used by the PoC service.

The PoC server requests a new GSU from the OCS after detecting that the PoC service has used up the reserved GSU.

After an online charging process succeeds, the service process continues.

Step 36: In the service process, the PoC server detects that the PoC service will switch the type of the downlink channel.

Step 37: The PoC server sends an online charging request to the OCS, where the online charging request includes a switched type of the downlink channel and a switching timestamp (Timestamp).

The timestamp may be used for subsequently generating a user bill or calculating the duration of using various downlink radio channels by the user.

Step 38: The OCS adjusts the tariff according to the switched type of the downlink channel, and reserves a new GSU for the PoC service.

Step 39: The OCS returns an online charging response message to the PoC server, where the online charging response message includes the new reserved GSU.

Step 310: The PoC server keeps monitoring usage of the GSU by the PoC service and the type of the downlink channel used by the PoC service until completion of the service.

Step 311: When the service is complete, the PoC server sends a final online charging request to the OCS, where the final online charging request includes the GSU used by the PoC service.

When the service completes, the PoC server may receive a service termination request sent by the PoC client.

Step 312: The OCS deducts a fee for usage of the PoC service according to the GSU used by the PoC service.

Step 313: The OCS returns a final charging response message to the PoC server.

Figure 4A:
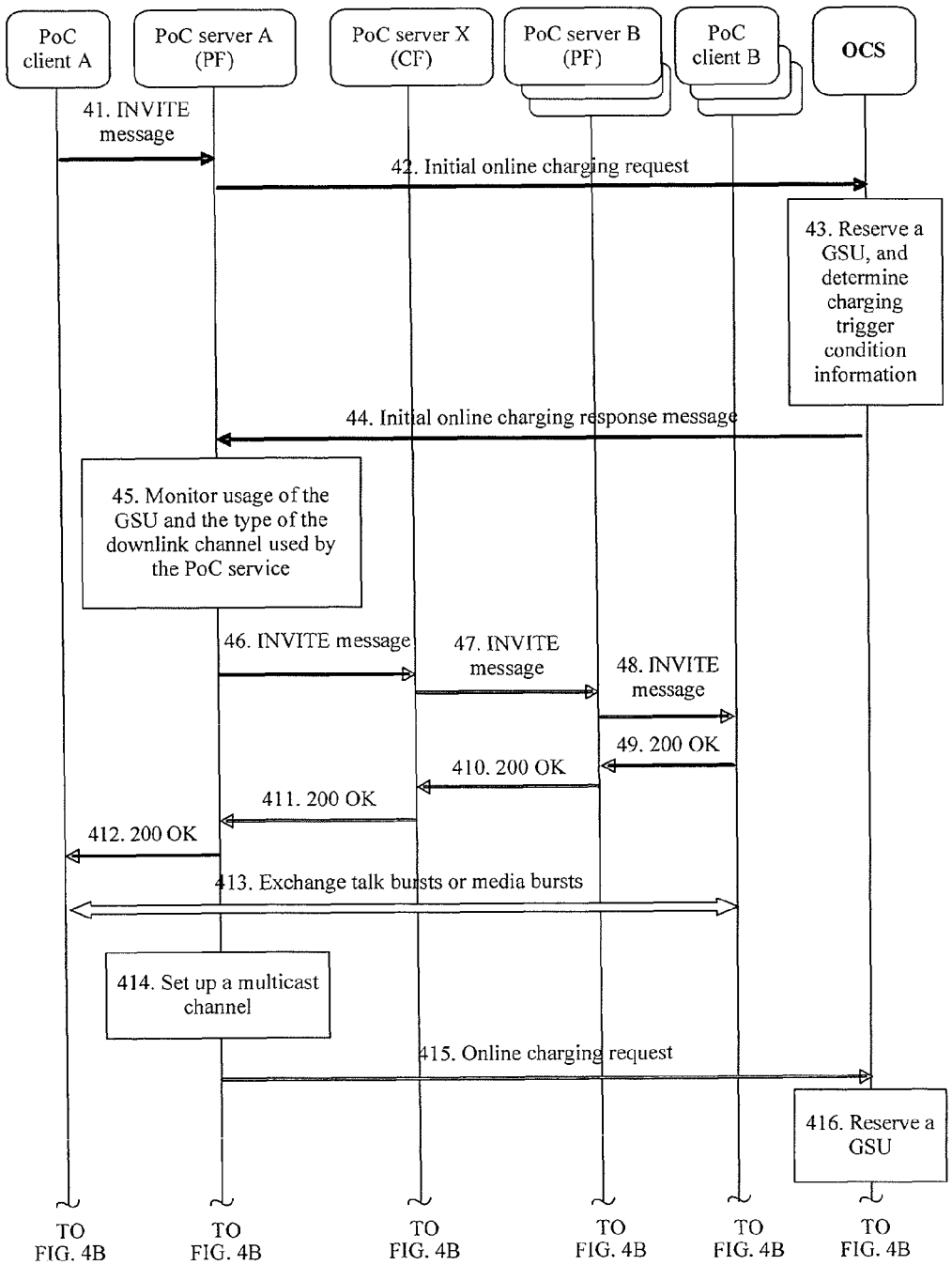
FIG. 4A and FIG. 4B are a schematic flowchart of an application scenario of a charging method for a PoC system according to another embodiment of the present invention.
Figure 4B:
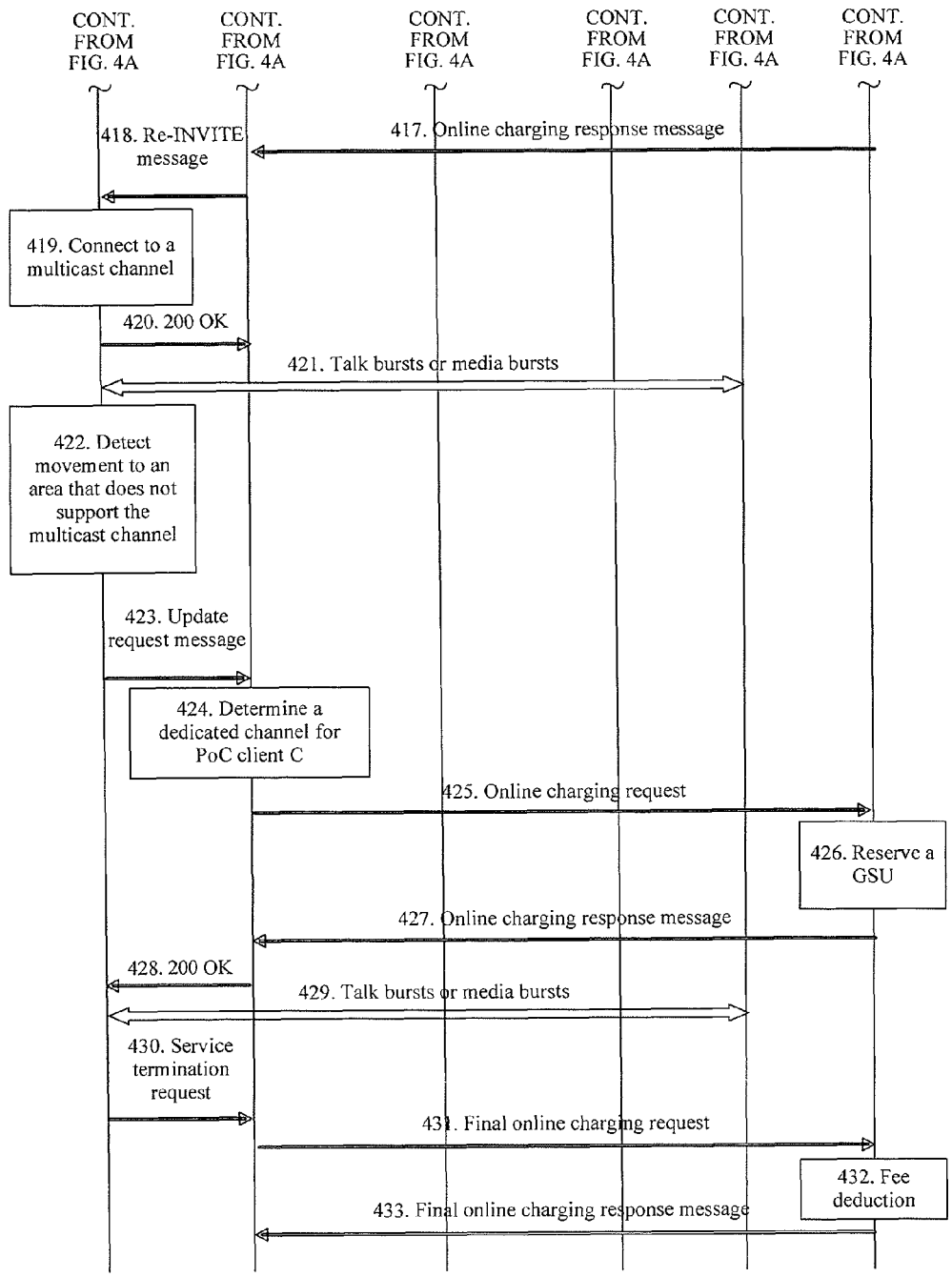

The following describes the technical solution of this embodiment through an application scenario. FIG. 4A and FIG. 4B are a schematic flowchart of an application scenario of a charging method for a PoC system according to another embodiment of the present invention. A PoC session is performed between PoC client A and PoC clients B, C, and D; and online charging is performed for PoC client A. A service initialization request may specifically be an INVITE (INVITE) message. Because processes of PoC clients C and D are basically the same as a process of PoC client B, the following description takes PoC client B as an example. The process may include the following steps:

Step 41: PoC client A sends an INVITE message to PoC server A, where the INVITE message includes a Support Multicast PoC Indication (Support Multicast PoC Indication) indicating that PoC client A supports a multicast channel.

PoC server A interacts with the OCS to perform charging for a service used by PoC client A, which includes the following steps:

Step 42: PoC server A sends an initial online charging request to the OCS, where the initial online charging request may include a Support-Multicast-Channel Indication indicating that PoC client A supports the multicast channel, and a type of a downlink channel (Downlink-Channel-Type=Normal PoC Channel) currently used by the PoC service.

Step 43: The OCS reserves a GSU for the PoC service according to a dedicated channel, and determines charging trigger (Trigger) condition information according to the Support-Multicast-Channel Indication, where the charging trigger condition information includes a downlink channel type switching trigger variable (Trigger-Type=CHANGE_IN_DOWNLINK_ACCESS_CHANNEL).

Step 44: The OCS returns an initial online charging response message, where the initial online charging response message includes the reserved GSU and the charging trigger condition information, and the charging trigger condition information includes the downlink channel type switching trigger variable.

Step 45: PoC server A monitors usage of the GSU by the PoC service according to the reserved GSU, and monitors, according to the downlink channel type switching trigger variable carried in the charging trigger condition information, the type of the downlink channel used by the PoC service.

Step 46 to Step 48: PoC server A forwards the INVITE message to PoC client B.

In the same way, the INVITE message is forwarded to PoC clients C and D.

Step 49 to Step 412: PoC client B returns a 200 OK message to PoC client A.

In the same way, PoC clients C and D return a 200 OK message to PoC client A.

Step 413: PoC clients A, B, C and D exchange talk bursts or media bursts with each other.

Step 414: PoC server A decides to set up a multicast channel for PoC client A according to a condition of setting up the multicast channel and a capability of PoC client A.

Afterward, PoC server A detects that PoC client A switches a downlink radio channel from the dedicated channel to the multicast channel in the service process, and PoC server A interacts with the OCS to perform charging for the multicast channel used by the PoC service, which may include the following steps:

Step 415: PoC server A sends an online charging request to the OCS, where the online charging request includes a switched type of the downlink channel (Downlink-Channel-Type=Multicast PoC Channel) and a switching timestamp (Timestamp=12:50:50, Feb. 13, 2009).

Step 416: The OCS reserves a new GSU for the PoC service according to the tariff of the multicast channel.

Step 417: The OCS returns an online charging response message to PoC server A, where the online charging response message includes the new GSU (Granted Service Unit, GSU for short) reserved according to the tariff of the multicast channel.

Step 418: PoC server A sends an INVITE response (re-INVITE) message to PoC client A to instruct PoC client A to get access to the multicast channel.

Step 419: PoC client A is connected to the multicast channel.

Step 420: PoC client A returns a 200 OK message to PoC server A.

Step 421: PoC client A uses the multicast channel to receive a downlink talk burst or media burst.

Step 422: PoC client A detects that the PoC client A moves to an area that does not support the multicast channel.

Step 423: PoC client A sends an update request (UPDATE) message to PoC server A to instruct the PoC server A that the PoC client A moves to the area that does not support the multicast channel.

Step 424: PoC server A decides to use a dedicated channel for the PoC client A.

Afterward, PoC server A interacts with the OCS to perform charging for the channel switching of the PoC service, which may include the following steps:

Step 425: PoC server A sends an online charging request to the OCS, where the online charging request includes a switched type of the downlink channel (Downlink-Channel-Type=Normal PoC Channel) and a switching timestamp (Timestamp=13:20:50, Feb. 13, 2009).

Step 426: The OCS reserves a new GSU for the PoC service according to the tariff of the dedicated channel.

Step 427: The OCS returns an online charging response message to PoC server A, where the online charging response message includes the new GSU reserved according to the tariff of the dedicated channel.

Step 428: PoC server A returns a 200 OK message to PoC client A.

Step 429: PoC client A uses the dedicated channel to receive the downlink talk burst or media burst.

Step 430: PoC client A sends a service termination request (BYE) message to PoC server A to end the PoC session.

Afterward, PoC server A interacts with the OCS to deduct a final fee for the usage of the PoC service, which may include the following steps:

Step 431: PoC server A sends a final online charging request, where the final online charging request carries the GSU used by the PoC service.

Step 432: The OCS deducts a fee for the service according to the GSU.

Step 433: The OCS returns a final online charging response message to PoC server A.

In this embodiment, after the PoC client switches the downlink radio channel, the PoC server sends the switched type of the downlink channel to the OCS. In the PoC session, the OCS adjusts the tariff in real time according to the type of the downlink channel, and performs online charging for the PoC client that switches the channel. In this way, an operator may accurately measure usage of radio resources by each PoC session participant in the session process, and precise and proper charging for the PoC client is implemented when the PoC client switches the channel.

In addition, the OCS may help the operator formulate a flexible tariff policy because the OCS may adjust the tariff in real time according to the type of the downlink channel. In this way, usage of radio resources by the operator is optimized; meanwhile, a benefit of a PoC user is ensured, so that the PoC user is willing to use a multicast technology in the PoC session, and a win-win result is achieved.

Figure 5:
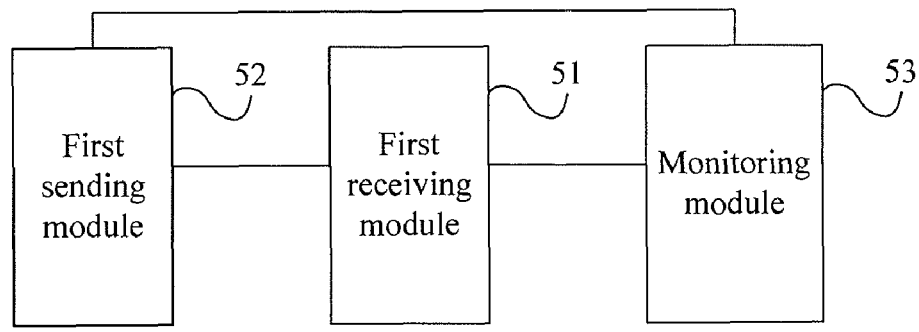
FIG. 5 is a schematic structural diagram of a PoC server according to an embodiment of the present invention.

FIG. 5 is a schematic structural diagram of a PoC server according to an embodiment of the present invention. The PoC server may include a first receiving module 51, a first sending module 52, and a monitoring module 53.

The first sending module 52 is configured to send an initial online charging request to an OCS. The first receiving module 51 is configured to receive an initial online charging response message that is sent by the OCS in response to the initial online charging request and carries a downlink channel type switching trigger variable. The monitoring module 53 is configured to monitor a type of a downlink channel used by a PoC service according to the downlink channel type switching trigger variable. The first sending module 52 is further configured to send an online charging request to the OCS if the monitoring module 53 detects switching of the type of the downlink channel used by the PoC service, where the online charging request includes a switched type of the downlink channel.

In this embodiment, when the service begins, the first sending module 52 sends an initial online charging request to the OCS, and the first receiving module 51 receives an initial online charging response message that is sent by the OCS and carries a downlink channel type switching trigger variable. The monitoring module 53 monitors the type of the downlink channel used by the PoC service according to the downlink channel type switching trigger variable. When the monitoring module 53 detects that the type of the downlink channel used by the PoC service is switched, the first sending module 52 sends an online charging request that carries the switched type of the downlink channel to the OCS. Therefore, the OCS may adjust a tariff according to the switched type of the downlink channel, and the operator may accurately measure usage of radio resources by each PoC client in a session process. In this way, an incapability of charging a PoC client that switches a channel in the prior art is overcome, and precise and proper charging for the PoC user is implemented when the PoC client switches the channel used by the PoC service.

An embodiment of the present invention provides another PoC server capable of charging a PoC client that switches a downlink radio channel. This embodiment differs from the preceding embodiment in that: The type of the downlink channel may include a dedicated channel or a multicast channel; when the service begins, the first receiving module 51 is further configured to receive a service initialization request sent by the PoC client, where the service initialization request may include a Support-Multicast-Channel Indication indicating that the PoC client supports a multicast channel; and the first sending module 52 is configured to send an initial online charging request to the OCS, where the initial online charging request may include the type of the downlink channel currently used by the PoC service.

In this embodiment, the initial online charging request may carry not only the type of the downlink channel currently used by the PoC service, but also the Support-Multicast-Channel Indication. The downlink channel type switching trigger variable that is carried in the initial charging response message received by the first receiving module 51 may be determined by the OCS according to the Support-Multicast-Channel Indication.

In this embodiment, the initial online charging response message may carry not only the downlink channel type switching trigger variable, but also a GSU that is reserved by the OCS according to the type of the downlink channel currently used by the PoC service. The monitoring module 53 is further configured to monitor usage of the GSU by the PoC service according to the reserved GSU.

In this embodiment, the online charging request may carry not only the switched type of the downlink channel, but also a timestamp at the time of switching the type of the downlink channel, where the timestamp is used by the PoC service. The timestamp may be used by the OCS to generate a user bill and/or calculate duration of using the downlink radio channel by the PoC service. The first receiving module 51 is further configured to receive an online charging response message sent by the OCS, where the online charging response message may include the new GSU reserved by the OCS according to the switched type of the downlink channel.

When the service is complete, the first receiving module 51 is further configured to receive a service termination request sent by the PoC client; and the first sending module 52 is further configured to send a final online charging request that carries the used GSU. In this way, the OCS may deduct a fee according to the GSU.

In this embodiment, when the service begins, the first receiving module 51 receives a service initialization request that is sent by the PoC client and carries a Support-Multicast-Channel Indication, and the first sending module 52 sends to the OCS an initial online charging request that carries the type of the downlink channel currently used by the PoC service and the Support-Multicast-Channel Indication. Afterward, the first receiving module 51 receives an initial online charging response message sent by the OCS, where the initial online charging response message includes the GSU that is reserved by the OCS according to the type of the downlink channel currently used by the PoC service, and a downlink channel type switching trigger variable that is determined by the OCS according to the Support-Multicast-Channel Indication. The monitoring module 53 monitors usage of the GSU by the PoC service according to the reserved GSU, and monitors the type of the downlink channel used by the PoC service according to the downlink channel type switching trigger variable. The monitoring module 53 detects switching of the type of the downlink channel currently used by the PoC service, and triggers the first sending module 52 to send to the OCS an online charging request that carries the switched type of the downlink channel and a switching timestamp. Afterward, the first receiving module 51 receives an online charging response message sent by the OCS, where the online charging response message includes the new GSU reserved by the OCS according to the switched type of the downlink channel. The monitoring module 53 monitors the type of the downlink channel used by the PoC service and the used GSU. After the service is complete, the first receiving module 51 receives a service termination request sent by the PoC client, and then the first sending module 52 sends to the OCS a final online charging request that carries the used GSU. Therefore, the OCS may adjust a tariff according to the type of the downlink channel used by the PoC client, and an operator may accurately measure usage of radio resources by each PoC client in a session process. In this way, an incapability of charging a PoC client that switches a channel used by the PoC service in the prior art is overcome, and precise and proper charging for the PoC client is implemented when the PoC client switches the channel.

In addition, the OCS may help the operator formulate a flexible tariff policy because the OCS may adjust the tariff in real time according to the type of the downlink channel. In this way, usage of radio resources by the operator is optimized; meanwhile, a benefit of a PoC user is ensured, so that the PoC user is willing to use a multicast technology in the PoC session, and a win-win result is achieved.

Figure 6:
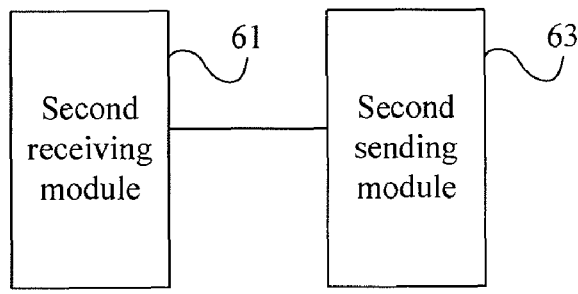
FIG. 6 is a schematic structural diagram of an OCS according to an embodiment of the present invention.

FIG. 6 is a schematic structural diagram of an OCS according to an embodiment of the present invention. The OCS may include a second receiving module 61 and a second sending module 63.

The second receiving module 61 is configured to receive an initial online charging request sent by a PoC server; and the second sending module 63 is configured to send to the PoC server an initial online charging response message that carries a downlink channel type switching trigger variable. The second receiving module 61 is further configured to receive an online charging request that is sent, after a change of a type of a downlink channel used by a PoC service is detected according to the downlink channel type switching trigger variable, by the PoC server, where the online charging request may include a switched type of the downlink channel.

In this embodiment, when the service begins, the second sending module 63 sends a downlink channel type switching trigger variable to the PoC server, and the second receiving module 61 receives an online charging request that is sent, when switching of the type of the downlink channel used by the PoC service is detected according to the downlink channel type switching trigger variable, by the PoC server, where the online charging request may include a switched type of the downlink channel. Therefore, the OCS may adjust a tariff according to the switched type of the downlink channel, and an operator may accurately measure usage of radio resources by each PoC client in a session process. In this way, an incapability of charging a PoC client that switches a channel used by the PoC service in the prior art is overcome, and precise and proper charging for the PoC client is implemented when the PoC client switches a channel.

Figure 7:
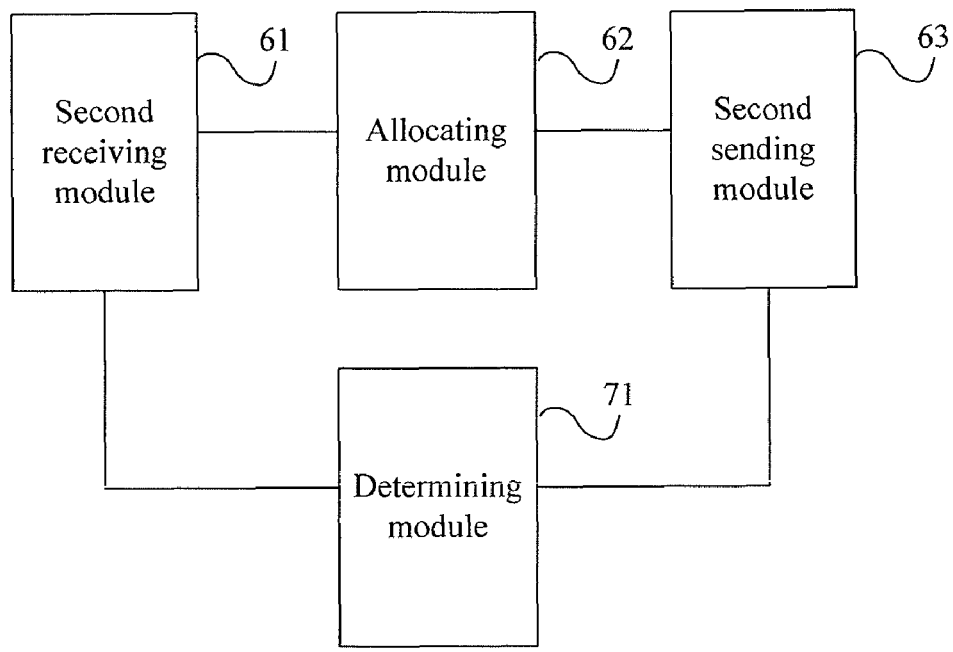
FIG. 7 is a schematic structural diagram of an OCS according to another embodiment of the present invention.

FIG. 7 is a schematic structural diagram of an OCS according to another embodiment of the present invention. This embodiment differs from the preceding embodiment in that: The type of the downlink channel may include a dedicated channel or a multicast channel; the second receiving module 61 is further configured to receive an initial online charging request that is sent by the PoC server and carries the type of the downlink channel currently used by the PoC service; after the second receiving module 61 receives the initial online charging request, the OCS may know the type of the downlink channel used by the PoC service; and the second sending module 63 is configured to send an initial online charging response message that carries a type of the downlink channel switching trigger variable to the PoC server.

The initial online charging request may include not only the type of the downlink channel currently used by the PoC service, but also a Support-Multicast-Channel Indication indicating that the PoC client supports a multicast channel. This embodiment may further include a determining module 71 configured to determine the downlink channel type switching trigger variable according to the Support-Multicast-Channel Indication. It should be noted that the determining the downlink channel type switching trigger variable may be irrelevant to the Support-Multicast-Channel Indication. That is, no matter whether the PoC client supports the multicast channel, the second sending module 63 may deliver the downlink channel type switching trigger variable to the PoC server, so as to instruct the PoC server to monitor the type of the downlink channel used by the PoC service.

This embodiment may further include an allocating module 62, which is configured to reserve a GSU according to the type of the downlink channel currently used by the PoC service after the second receiving module 61 receives the initial online charging request that carries the type of the downlink channel currently used by the PoC service. The initial online charging response message may carry not only the downlink channel type switching trigger variable but also the reserved GSU.

In addition, the allocating module 62 is further configured to reserve a new GSU according to a switched type of the downlink channel after the second receiving module 61 receives an online charging request that carries the switched type of the downlink channel. The second sending module is further configured to send the online charging response message that carries the new reserved GSU to the PoC server.

In this embodiment, the second receiving module 61 may be further configured to receive a final online charging request that is sent by the PoC server and carries the used GSU.

In this embodiment, the online charging request may carry not only the switched type of the downlink channel, but also a timestamp at the time of switching the type of the downlink channel used by the PoC service. The timestamp may be used to subsequently generate a user bill, calculate duration of using each type of downlink radio channel by a user, and so on.

In this embodiment, when the service begins, the second receiving module 61 receives an initial online charging request that is sent by the PoC server and carries the type of the downlink channel currently used by the PoC service and the Support-Multicast-Channel Indication; the allocating module 62 determines a tariff according to the type of the downlink channel currently used, and reserves a GSU; the determining module 71 determines, according to the Support-Multicast-Channel Indication, charging trigger condition information that includes the downlink channel type switching trigger variable; and then the second sending module 63 sends to the PoC server an initial online charging response message that carries the reserved GSU and the charging trigger condition information. In the service process, if the PoC server detects, according to the downlink channel type switching trigger variable, a switching of the type of the downlink channel used by the PoC service, the second receiving module 61 receives an online charging request that is sent by the PoC server and carries the switched type of the downlink channel and a switching timestamp; the allocating module 62 reserves a new GSU according to the switched type of the downlink channel; and then the second sending module 63 sends to the PoC server an online charging response message that carries the new GSU. After the service is complete, the second receiving module 61 receives a final online charging request that is sent the PoC server and carries the used GSU; afterward, the OCS may deduct a fee according to the used GSU. Therefore, the OCS may adjust the tariff according to the Downlink channel type, and an operator may accurately measure usage of radio resources by each PoC client in the session process. In this way, an incapability of charging a PoC client that switches a channel in the prior art is overcome, and precise and proper charging for the PoC client may be implemented when the PoC client switches the channel.

In addition, the OCS may help the operator formulate a flexible tariff policy because the OCS may adjust the tariff in real time according to the type of the downlink channel. In this way, usage of radio resources by the operator is optimized; meanwhile, a benefit of a PoC user is ensured, so that the PoC user is willing to use a multicast technology in the PoC session, and a win-win result is achieved.

Figure 8:
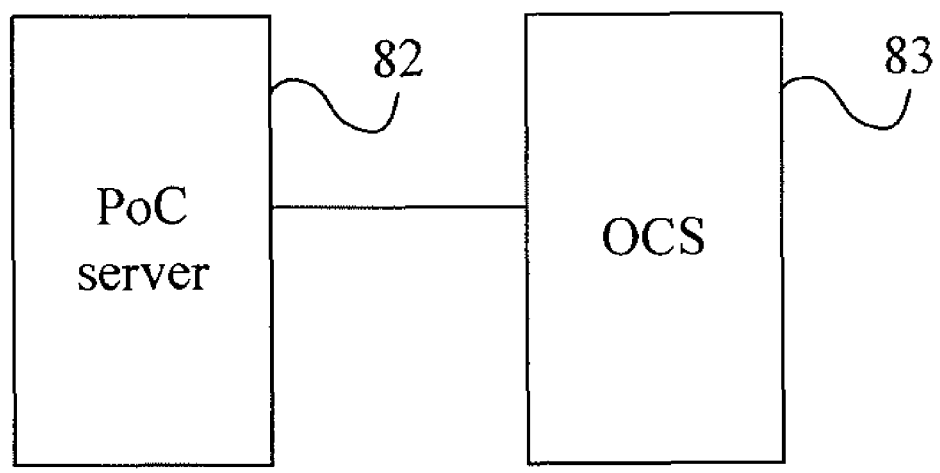
FIG. 8 is a schematic structural diagram of a charging system for a PoC system according to an embodiment of the present invention.

FIG. 8 is a schematic structural diagram of a charging system for a PoC system according to an embodiment of the present invention. The charging system may include a PoC server 82 and an OCS 83.

When a service begins, the PoC server 82 sends an initial charging request to the OCS 83; after receiving the initial charging request, the OCS 83 sends to the PoC server 82 an initial online charging response message that carries a downlink channel type switching trigger variable; after receiving the initial online charging response message, the PoC server 82 monitors a type of a downlink channel used by a PoC service according to the downlink channel switching trigger variable. If detecting a switching of the type of the downlink channel used by the PoC service, the PoC server 82 sends an online charging request to the OCS 83, where the online charging request carries the switched type of the downlink channel. The OCS 83 receives the online charging request, so that the OCS 83 may adjust a tariff according to the switched type of the downlink channel after the PoC client switches the channel. Therefore, an operator may accurately measure usage of radio resources by each PoC client in a session process. In this way, an incapability of charging a PoC client that switches a channel in the prior art is overcome, and precise and proper charging for the PoC client is implemented when the PoC client switches the channel.

In this embodiment, the PoC server 82 may include any module in the preceding PoC server embodiment, and the OCS 83 may include any module in the preceding OCS embodiment. No further description is provided here.

Finally, it should be noted that the preceding embodiments are merely provided for describing the technical solutions of the present invention, but not intended to limit the present invention. Although the present invention is described in detail with reference to exemplary embodiments, persons of ordinary skill in the art should understand that modifications and substitutions can be made to the technical solutions of the present invention without departing from the spirit and scope of the present invention.

What is claimed is:

1. A charging method for a Push-to-Talk over Cellular (PoC) system, the method comprising:
   sending an initial online charging request to an Online Charging System (OCS), the initial online charging request comprising information identifying a type of downlink channel currently used by the PoC service;

receiving an initial online charging response message that is sent by the OCS and carries a downlink channel type switching trigger variable, the initial online charging response message further comprising a Granted Service Unit (GSU) reserved by the OCS according to the type of downlink channel currently used by the PoC service;

monitoring the type of downlink channel used by the PoC service according to the downlink channel type switching trigger variable by monitoring usage of the reserved GSU by the PoC service according to the reserved GSU; and sending an online charging request to the OCS if switching of the type of downlink channel used by the PoC service is detected, wherein the online charging request comprises a switched type of downlink channel.

2. The method according to claim 1, wherein before the sending an initial online charging request to an OCS, the method further comprises:

receiving a service initialization request sent by a PoC client, wherein the service initialization request comprises a Support-Multicast-Channel Indication indicating that the PoC client supports a multicast channel; wherein the initial online charging request comprises the Support-Multicast-Channel Indication; and the downlink channel type switching trigger variable is determined by the OCS according to the Support-Multicast-Channel Indication.

3. The method according to claim 1, wherein the online charging request further comprises a timestamp at the time of switching the type of downlink channel used by the PoC service; and the timestamp is used for the OCS to generate a user bill and/or calculate duration of using a downlink channel by the PoC service.

4. A charging method for a Push-to-Talk over Cellular (PoC) system, the method comprising:

receiving an initial online charging request sent by a PoC server, the initial online charging request comprising information identifying a type of downlink channel currently used by a PoC service;

reserving a Granted Service Unit (GSU) according to the type of downlink channel currently used by the PoC service;

sending to the PoC server an initial online charging response message that carries a downlink channel type switching trigger variable and the GSU; and receiving an online charging request that is sent, after a change of the type of downlink channel used by a PoC service is detected according to the downlink channel type switching trigger variable, by the PoC server, wherein the online charging request comprises a switched type of the downlink channel.

5. The method according to claim 4, wherein:

the initial online charging request further comprises a Support-Multicast-Channel Indication indicating that a PoC client supports a multicast channel;

before the sending the initial online charging response message, determining the downlink channel type switching trigger variable according to the Support-Multicast-Channel Indication.

6. The method according to claim 4, wherein:

the online charging request further comprises a timestamp at the time of switching the type of downlink channel used by the PoC service; and the timestamp is used for an Online Charging System (OCS) to generate a user bill and/or calculate duration of using a downlink channel by the PoC service.

7. A Push-to-Talk over Cellular (PoC) server, comprising:

a first sending module, configured to send an initial online charging request to an Online Charging System (OCS), the initial online charging request comprising information identifying a type of downlink channel currently used by the PoC service;

a first receiving module, configured to receive an initial online charging response message that is sent by the OCS and carries a downlink channel type switching trigger variable, the initial online charging response message further comprising a Granted Service Unit (GSU) reserved by the OCS according to the type of downlink channel currently used by the PoC service; and a monitoring module, configured to monitor the type of downlink channel used by the PoC service according to the downlink channel type switching trigger variable by monitoring usage of the reserved GSU by the PoC service according to the reserved GSU; wherein the first sending module is further configured to send an online charging request to the OCS if the monitoring module detects switching of the type of downlink channel used by the PoC service, wherein the online charging request comprises a switched type of downlink channel.

8. The PoC server according to claim 7, wherein:

the first receiving module is further configured to receive a service initialization request sent by a PoC client, wherein the service initialization request comprises a Support-Multicast-Channel Indication indicating that the PoC client supports a multicast channel;

the initial online charging request comprises the Support-Multicast-Channel Indication; and the downlink channel type switching trigger variable is determined by the OCS according to the Support-Multicast-Channel Indication.

9. The PoC server according to claim 7, wherein:

the online charging request further comprises a timestamp at the time of switching the type of downlink channel used by the PoC service; and the timestamp is used for the OCS to generate a user bill and/or calculate duration of using a downlink radio channel by the PoC client.

10. An Online Charging System (OCS), comprising:

a second receiving module, configured to receive an initial online charging request sent by a Push-to-talk over Cellular (PoC) server, the initial online charging request comprising information identifying a type of downlink channel currently used by a PoC service;

an allocating module, configured to reserve a Granted Service Unit (GSU) according to the type of the downlink channel currently used by the PoC service; and a second sending module, configured to send to the PoC server an initial online charging response message that carries a downlink channel type switching trigger variable and the GSU; wherein the second receiving module is further configured to receive an online charging request that is sent, after a change of the type of downlink channel used by a PoC service is detected according to the downlink channel type switching trigger variable, by the PoC server, wherein the online charging request comprises a switched type of the downlink channel.

11. The OCS according to claim 10, wherein:
the initial online charging request comprises a Support-Multicast-Channel Indication indicating that a PoC client supports a multicast channel; and
the OCS further comprises:
a determining module, configured to determine the downlink channel type switching trigger variable according to the Support-Multicast-Channel Indication.

12. The OCS according to claim 10, wherein:
the online charging request further comprises a timestamp at the time of switching the type of downlink channel used by the PoC service; and the timestamp is used for the OCS to generate a user bill and/or calculate duration of using a downlink channel by the PoC service.

* * * * *

UNITED STATES PATENT AND TRADEMARK OFFICE
CERTIFICATE OF CORRECTION

PATENT NO. : 8,331,903 B2
APPLICATION NO. : 13/310355
DATED : December 11, 2012
INVENTOR(S) : Jiao Kang et al.

It is certified that error appears in the above-identified patent and that said Letters Patent is hereby corrected as shown below:

In the Claims

Column 14, Claim 9, line 46, after "downlink", delete "radio".

Signed and Sealed this
Twelfth Day of November, 2013

Teresa Stanek Rea
*Deputy Director of the United States Patent and Trademark Office*